under 35 U.S.C. 154(b) by 603 days.

United States Patent
Patchava et al.

(10) Patent No.: US 12,309,727 B2
(45) Date of Patent: May 20, 2025

(54) TECHNIQUES FOR RATE MATCHING ORDER FOR ORTHOGONAL TIME FREQUENCY SPACE MULTIPLEXING

(71) Applicant: QUALCOMM Incorporated, San Diego, CA (US)

(72) Inventors: Raviteja Patchava, San Diego, CA (US); Jun Ma, San Diego, CA (US); Jing Sun, San Diego, CA (US); Sony Akkarakaran, Poway, CA (US); Morteza Soltani, San Diego, CA (US); Xiaoxia Zhang, San Diego, CA (US); Zhifei Fan, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 603 days.

(21) Appl. No.: 17/667,254

(22) Filed: Feb. 8, 2022

(65) Prior Publication Data

US 2023/0254793 A1 Aug. 10, 2023

(51) Int. Cl.
*H04W 56/00* (2009.01)
*H04L 1/00* (2006.01)
(Continued)

(52) U.S. Cl.
CPC ....... *H04W 56/0045* (2013.01); *H04L 1/0071* (2013.01); *H04L 5/0023* (2013.01); *H04L 27/26526* (2021.01)

(58) Field of Classification Search
None
See application file for complete search history.

(56) References Cited

U.S. PATENT DOCUMENTS 9,860,764 B2 * 1/2018 Krishnamoorthy ........................ H04L 25/0232
11,184,122 B2 * 11/2021 Sathyanarayan ...... H04B 1/385
(Continued)

FOREIGN PATENT DOCUMENTS

WO WO-2018169620 A1 * 9/2018 ........... H04L 25/021
WO WO-2020238573 A1 * 12/2020 ........... H04L 27/261
WO WO-2021033118 A1 * 2/2021 ............... H04B 7/04

OTHER PUBLICATIONS

Chen et al., WO2020238573A1 Signal processing method and apparatus, Publication Date: Dec. 3, 2020 (Year: 2020).*

*Primary Examiner* — Wutchung Chu
*Assistant Examiner* — Berhanu D Belete
(74) *Attorney, Agent, or Firm* — Dalei Dong; Holland & Hart LLP

(57) ABSTRACT

Methods, systems, and devices for wireless communications are described. A wireless device may generate a orthogonal time frequency space (OTFS) waveform for transmission to a second wireless device. Generation of an OTFS waveform may include mapping information samples to a delay-Doppler resource grid having a set of delay values and a set of Doppler values. A channel estimation block may occupy one or more rows of the delay-Doppler grid. When mapping information samples to the delay-Doppler grid, the transmitting device may first map information samples in the delay dimension (e.g., first map all of the symbols in one column of the delay-Doppler grid before mapping information samples into a second column). Such a mapping scheme may reduce the distance from any given information sample to the channel estimation block.

30 Claims, 11 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 2015/0282123 A1* | 10/2015 | Miao | H04W 48/00 |
| | | | 455/450 |
| 2016/0127922 A1* | 5/2016 | Krishnamoorthy | H04W 24/02 |
| | | | 370/329 |
| 2019/0109749 A1* | 4/2019 | Bai | H04L 27/2644 |
| 2020/0389268 A1* | 12/2020 | Sathyanarayan | H01Q 21/28 |
| 2021/0250138 A1* | 8/2021 | Ibars Casas | H04L 27/0008 |
| 2021/0336716 A1* | 10/2021 | Horn | H04L 5/0046 |
| 2021/0336754 A1* | 10/2021 | Horn | H04L 5/0083 |
| 2022/0085928 A1* | 3/2022 | Sathyanarayan | H01Q 21/28 |
| 2022/0224464 A1* | 7/2022 | Rakib | H04B 7/0452 |
| 2023/0036989 A1* | 2/2023 | Jöngren | H04L 5/0048 |

* cited by examiner

TECHNIQUES FOR RATE MATCHING ORDER FOR ORTHOGONAL TIME FREQUENCY SPACE MULTIPLEXING

FIELD OF TECHNOLOGY

The following relates to wireless communications, including techniques for rate matching order for orthogonal time frequency space multiplexing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for rate matching order for orthogonal time frequency space (OTFS) multiplexing. Generation of an OTFS waveform at a first wireless device (e.g., a user equipment (UE) or a network device) may include mapping information samples for transmission to a second wireless device to a delay-Doppler resource grid having a range of delay values and a range of Doppler values. The transmitting device may apply a precoder (e.g., an inverse symplectic fast Fourier transform (ISFFT) to convert the delay-Doppler grid to the time-frequency domain. The delay-Doppler grid may include a set of resource elements each having a respective delay value of the range of delay values and a respective Doppler value of the range of Doppler values. A channel estimation block may occupy one or more rows of the delay-Doppler grid.

In some examples, when mapping information samples to the delay-Doppler grid, the transmitting device may first map information samples in the delay dimension. For example, the transmitting device may map all of the symbols in one column of the delay-Doppler grid before mapping information samples into a second column of the delay-Doppler grid. Such a mapping scheme may reduce the distance from any given information sample to the channel estimation block, thereby distributing burst errors and increasing coding performance.

A method for wireless communications at a first device is described. The method may include obtaining information samples for wireless transmission to a second device in accordance with an OTFS precoding scheme, mapping the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value, encoding, in accordance with the OTFS precoding scheme, a message including the mapped information samples and the channel estimation block, and transmitting the encoded message to the second device via a wireless communication channel.

An apparatus for wireless communications at a first device is described. The apparatus may include a processor, memory coupled with the processor, and instructions stored in the memory. The instructions may be executable by the processor to cause the apparatus to obtain information samples for wireless transmission to a second device in accordance with an OTFS precoding scheme, map the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value, encode, in accordance with the OTFS precoding scheme, a message including the mapped information samples and the channel estimation block, and transmit the encoded message to the second device via a wireless communication channel.

Another apparatus for wireless communications at a first device is described. The apparatus may include means for obtaining information samples for wireless transmission to a second device in accordance with an OTFS precoding scheme, means for mapping the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value, means for encoding, in accordance with the OTFS precoding scheme, a message including the mapped information samples and the channel estimation block, and means for transmitting the encoded message to the second device via a wireless communication channel.

A non-transitory computer-readable medium storing code for wireless communications at a first device is described. The code may include instructions executable by a processor to obtain information samples for wireless transmission to a second device in accordance with an OTFS precoding scheme, map the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value, encode, in accordance with the OTFS precoding scheme, a message including the mapped information samples and the channel estimation block, and transmit the encoded message to the second device via a wireless communication channel.

In some examples of the method, apparatuses, and non-transitory computer-readable medium described herein, mapping the information samples to the delay-Doppler resource grid may include operations, features, means, or instructions for sequentially mapping the information samples within each respective subset of resource elements from a first resource element of the respective subset of resource elements having a lowest delay value to a second resource element of the respective subset of resource elements having a highest delay value.

In some examples of the method, apparatuses, and non-transitory computer-readable medium described herein, mapping the information samples to the delay-Doppler resource grid may include operations, features, means, or instructions for sequentially mapping the information samples within each respective subset of resource elements from a first resource element of the respective subset of resource elements having a highest delay value to a second resource element of the respective subset of resource elements having a lowest delay value.

In some examples of the method, apparatuses, and non-transitory computer-readable medium described herein, mapping the information samples to the delay-Doppler resource grid may include operations, features, means, or instructions for mapping the information samples within each respective subset of resource elements according to an interleaving pattern.

In some examples of the method, apparatuses, and non-transitory computer-readable medium described herein, encoding the message may include operations, features, means, or instructions for applying an ISFFT to the mapped information samples and the channel estimation block.

In some examples of the method, apparatuses, and non-transitory computer-readable medium described herein, encoding the message may include operations, features, means, or instructions for applying an inverse fast Fourier transform to an output of the ISFFT to generate an OTFS waveform.

In some examples of the method, apparatuses, and non-transitory computer-readable medium described herein, the subset of delay values may be based on a delay spread of the wireless communication channel and a bandwidth of the wireless communication channel.

Some examples of the method, apparatuses, and non-transitory computer-readable medium described herein may further include operations, features, means, or instructions for selecting an interleaving pattern for the delay-Doppler resource grid, where mapping the information samples to the delay-Doppler resource grid may be based on the interleaving pattern.

Some examples of the method, apparatuses, and non-transitory computer-readable medium described herein may further include operations, features, means, or instructions for transmitting, in the channel estimation block, a demodulation reference signal.

DETAILED DESCRIPTION

Figure 1:
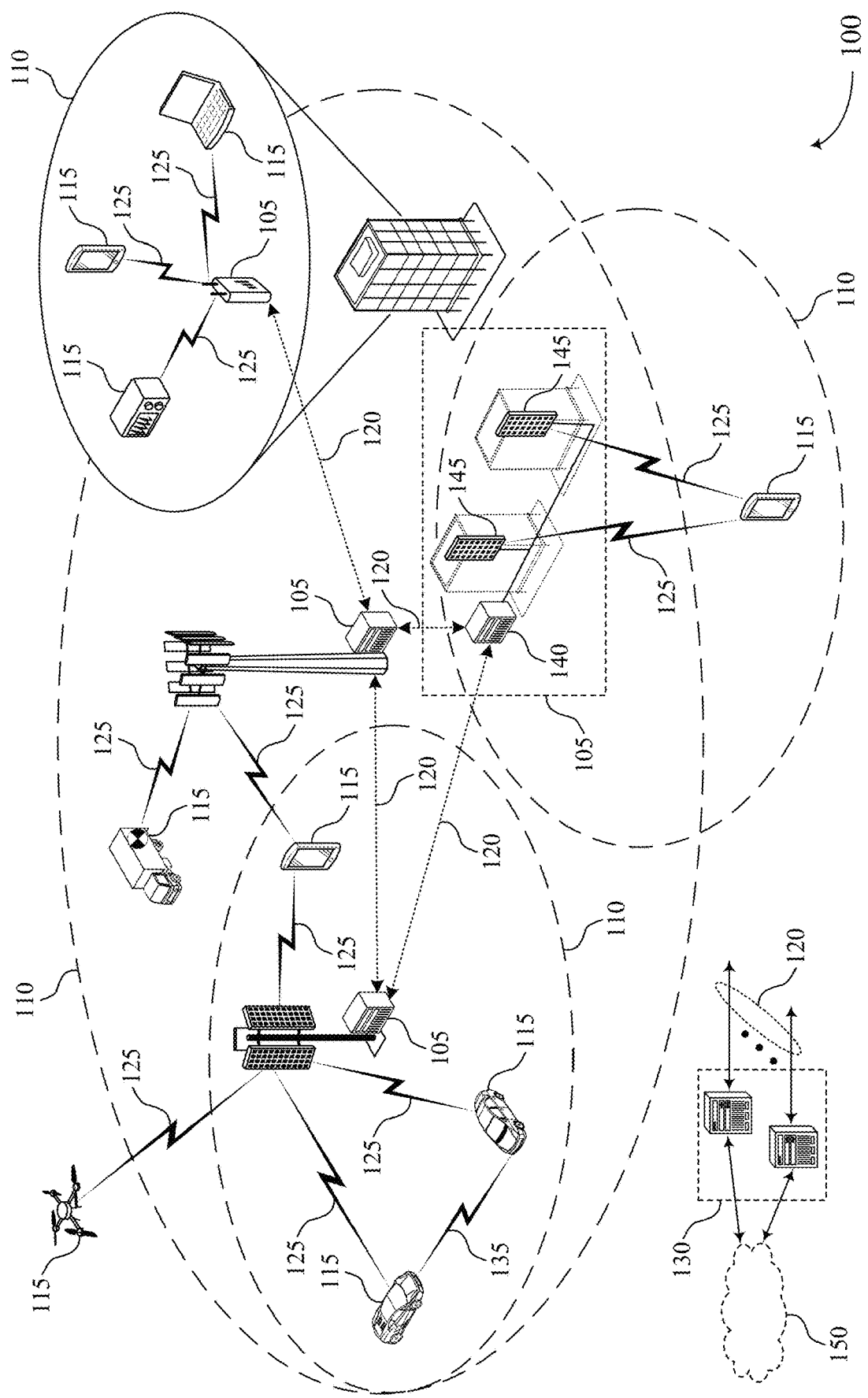
FIG. 1 illustrates an example of a wireless communications system that supports techniques for rate matching order for orthogonal time frequency space (OTFS) multiplexing in accordance with various aspects of the present disclosure.

Some wireless communications systems may use orthogonal time frequency space (OTFS) waveforms. For example, OTFS waveforms may be used for high-mobility states or in high Doppler spread scenarios, such as on highways or on high-speed trains. Generation of an OTFS waveform at a first wireless device (e.g., a user equipment (UE) or a network device) includes mapping information samples for transmission to a second wireless device to a delay-Doppler resource grid having a range of delay values and a range of Doppler values. The transmitting device may apply a precoder (e.g., an inverse symplectic fast Fourier transform (ISFFT)) to convert the delay-Doppler grid to the time-frequency domain. Once in the time-frequency domain, an orthogonal frequency division multiplexing (OFDM) modulator may be used to generate an OFDM waveform (e.g., an OTFS waveform) for transmission over the air to a second wireless device.

The delay-Doppler grid may include a set of resource elements each having a respective delay value of the range of delay values and a respective Doppler value of the range of Doppler values. For example, the delay-Doppler grid may be represented as a grid with columns representing Doppler values and rows representing delay values. A channel estimation block may occupy one or more rows of the delay-Doppler grid. A demodulation reference signal (DMRS) may be transmitted within the channel estimation block in order for the receiving device to estimate the channel and correct for error (e.g., caused by delay spread). Channel estimation for resource elements that are sequentially far away from the channel estimation block may be inaccurate.

In some examples, when mapping information samples to the delay-Doppler grid, the transmitting device may first map information samples in the delay dimension. For example, the transmitting device may map all of the symbols in one column of the delay-Doppler grid before mapping information samples into a second column of the delay- Doppler grid. Such a mapping scheme may reduce the distance from any given information sample to the channel estimation block, thereby distributing burst errors and increasing coding performance. In some examples, the transmitting device may interleave or permutate resource elements within the Doppler columns when mapping information samples to a given Doppler column (e.g., rather than mapping information samples by increasing or decreasing delay row value). Interleaving or permutating within columns may increase performance in the case of many resource elements per symbol. In some examples, the transmitting device may interleave or permutate resource elements by Doppler column and delay row prior to mapping information samples to the delay-Doppler grid.

Aspects of the disclosure are initially described in the context of wireless communications systems. Aspects of the disclosure are further illustrated by and described with reference to encoding schemes and processing diagrams. Aspects of the disclosure are further illustrated by and described with reference to apparatus diagrams, system diagrams, and flowcharts that relate to techniques for rate matching order for OTFS multiplexing.

FIG. 1 illustrates an example of a wireless communications system 100 that supports techniques for rate matching order for OTFS multiplexing in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both).

Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell, for example, covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

Thus, as described herein, a base station 105 may include one or more components that are located at a single physical location or one or more components located at various physical locations. In examples in which the base station 105 includes components that are located at various physical locations, the various components may each perform various functions such that, collectively, the various components achieve functionality that is similar to a base station 105 that is located at a single physical location. As such, a base station 105 described herein may equivalently refer to a standalone base station 105 (also known as a monolithic base station) or a base station 105 including components that are located at various physical locations or virtualized locations (also known as a disaggregated base station). In some implementations, such a base station 105 including components that are located at various physical locations may be referred to as or may be associated with a disaggregated radio access network (RAN) architecture, such as an Open RAN (O-RAN) or Virtualized RAN (VRAN) architecture. In some implementations, such components of a base station 105 may include or refer to one or more of a central unit (or centralized unit CU), a distributed unit (DU), or a radio unit (RU).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at given orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a given orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, wireless devices (e.g., base stations 105 and/or UEs 115) may communicate via use of OTFS waveforms. For example, OTFS waveforms may be used for high-mobility states or in high Doppler spread scenarios, such as on highways or on high-speed trains (e.g., a UE 115 on a highway or a high-speed train). Generation of an OTFS waveform at a first wireless device (e.g., a user equipment (UE) or a network device) includes mapping information samples for transmission to a second wireless device to a delay-Doppler resource grid having a range of delay values and a range of Doppler values. The transmitting device (e.g., a transmitting UE 115 or a transmitting base station 105) may apply a precoder (e.g., an ISFFT) to convert the delay-Doppler resource grid to the time-frequency domain. Once in the time-frequency domain, an OFDM modulator may be used to generate an OFDM waveform for transmission over the air to a second wireless device (e.g., a receiving UE 115 or a receiving base station 105).

The delay-Doppler resource grid may include a set of resource elements each having a respective delay value of the range of delay values and a respective Doppler value of the range of Doppler values. For example, the delay-Doppler resource grid may be represented as a grid with columns representing Doppler values and rows representing delay values. A channel estimation block may occupy one or more rows of the delay-Doppler resource grid. A DMRS may be transmitted within the channel estimation block in order for the receiving device (e.g., the receiving UE 115 or the receiving base station 105) to estimate the channel and correct for error (e.g., caused by delay spread). Channel estimation for resource elements that are sequentially far away from the channel estimation block may be inaccurate.

In some examples, when mapping information samples to the delay-Doppler resource grid, the transmitting device (e.g., the transmitting UE 115 or the transmitting base station 105) may first map information samples in the delay dimension. For example, the transmitting device may map all of the symbols in one column of the delay-Doppler resource grid before mapping information samples into a second column of the delay-Doppler resource grid. Such a mapping scheme may reduce the distance from any information sample to the channel estimation block, thereby distributing burst errors and increasing coding performance. In some examples, the transmitting device may interleave or permutate resource elements within the Doppler columns when mapping information samples to a given Doppler column (e.g., rather than mapping information samples by increasing or decreasing delay row value). Interleaving or permutating within columns may increase performance in the case of many resource elements per symbol. In some examples, the transmitting device may interleave or permutate resource elements by Doppler column and delay row prior to mapping information samples to the delay-Doppler resource grid.

Figure 2:
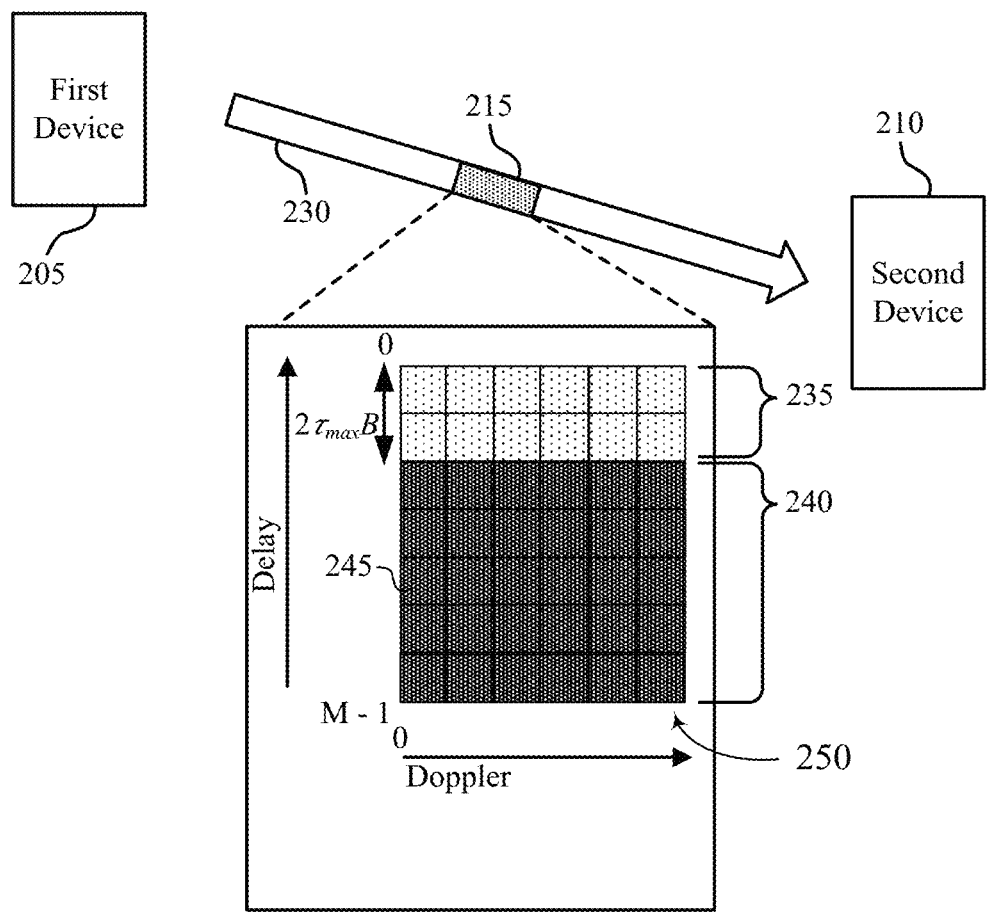
FIG. 2 illustrates an example of a wireless communications system that supports techniques for rate matching order for OTFS multiplexing in accordance with various aspects of the present disclosure.

FIG. 2 illustrates an example of a wireless communications system 200 that supports techniques for rate matching order for OTFS multiplexing in accordance with various aspects of the present disclosure. The wireless communications system 200 may implement or be implemented to realize aspects of the wireless communications system 100. For example, the wireless communications system 200 illustrates communication between a first wireless device 205 and a second wireless device 210 via a communication link 230, and the first wireless device 205 and the second wireless device 210 may be examples of one or more devices as described with reference to FIG. 1. For example, the first wireless device 205 may be an example of a UE 115, one or more components of a base station 105, a TRP, a small cell, a sidelink device, or any other device that is capable of transmitting the signal 215 including a channel estimation block 235 (including a set of DMRS symbols) and a data block 240 (including a set of information symbols/samples). The second wireless device 210 may be an example of a UE 115, one or more components of a base station 105, a TRP, a small cell, a sidelink device, or any other device that is capable of receiving the signal 215 including the channel estimation block 235 and the data block 240.

The signal 215 may be an OTFS-precoded waveform generated by the first wireless device 205. Generating the OTFS waveform includes mapping information samples for transmission to the second wireless device 210 to a delay-Doppler resource grid 250 having a range of delay values and a range of Doppler values. The first wireless device 205 may apply a precoder (e.g., an ISFFT) to convert the delay-Doppler resource grid to the time-frequency domain. Once in the time-frequency domain, an OFDM modulator may be used to generate an OFDM waveform for transmission over the air as a signal 215 to the second wireless device 210. The second wireless device 210 may receive the signal 215 as a time domain signal. As described with reference to FIG. 3, the second wireless device 210 may perform or apply an OFDM demodulator on the received time domain signal 215 to obtain a set of symbols in the time-frequency domain. The second wireless device 210 may perform or apply a symplectic fast Fourier transform (SFFT) on the set of symbols in the time-frequency domain to obtain a set of symbols in the delay-Doppler domain. The second wireless device 210 may extract the information samples from the set of symbols in the delay-Doppler domain.

The delay-Doppler resource grid 250 may include a set of resource elements 245 each having a respective delay value of the range of delay values and a respective Doppler value of the range of Doppler values. For example, the delay-Doppler resource grid 250 may be represented as a grid with columns representing Doppler values and rows representing delay values. Theoretically, each information sample mapped into the resource elements 245 may experience the same delay-Doppler channel independent of the location of the respective resource element 245 in the delay-Doppler resource grid 250. In practice, however, a channel estimation block 235 may occupy one or more rows of the delay-Doppler resource grid 250. The channel estimation block 235 may occupy $(2*\Sigma_{max}*B)$ space in the delay domain, where $*\tau_{max}$ represents the maximum delay spread of the channel associated with the communication link 230 and B represents the bandwidth of the channel associated with the communication link 230. A DMRS may be transmitted within the channel estimation block 235 in order for the second wireless device 210 to estimate the channel and correct for error (e.g., caused by delay spread).

Doppler resolution for OTFS precoding may be equal to $N/\Delta f$, where $\Delta f$ represents the subcarrier spacing for the channel and N represents the total number of symbols transmitted in the signal 215. However, N may not be large due to latency targets, which may limit an achievable Doppler resolution. Accordingly, the channel Doppler may be a fraction of the delay-Doppler resource grid 250 and may cause imperfect channel estimation. As a result of the channel Doppler being a fraction of the delay-Doppler resource grid 250, $$k_{v_i}\left(=\frac{v_i N}{\Delta f}\right)$$

(where $v_i$ represents the Doppler path of i, as described with reference to FIGS. 3 and 4) may become fractional and difficult to estimate. Due to the error in $k_{v_i}$, the information samples that are mapped to resource elements 245 far away from the channel estimation (e.g., at the bottom of the delay-Doppler resource grid 250) may experience a less accurate channel estimation. For example, as shown in equation 6, as delay value l increases, l is multiplied by $k_{v_i}$, compounding channel estimation error.

Accordingly when mapping information samples to the delay-Doppler resource grid 250, the first wireless device 205 may first map information samples in the delay dimension and then map information samples in the Doppler dimension. For example, the transmitting device may map information samples to all of the resource elements 245 in one column of the delay-Doppler resource grid 250 before mapping information samples into a second column of the delay-Doppler resource grid 250. Such a mapping scheme may reduce the distance from any information sample in any resource element 245 to the channel estimation block 235, thereby distributing burst errors and increasing coding performance.

In some examples, within each column of the delay-Doppler resource grid 250, the first wireless device 205 may map information samples into resource elements 245 by increasing delay value (e.g., from the resource element 245 at the top of the column to the resource element 245 at the bottom of the column). In some examples, within each column of the delay-Doppler resource grid 250, the first wireless device 205 may map information samples into resource elements 245 by decreasing delay value (e.g., from the resource element 245 at the bottom of the column to the resource element 245 at the top of the column). In some examples, within each column of the delay-Doppler resource grid 250, the first wireless device 205 may map information samples into resource elements 245 according to a permutation or interleaving pattern. For example, mapping the information samples into each column of the delay-Doppler resource grid 250 according to a permutation or interleaving pattern may uniformly distribute the code block in the delay domain. In some examples, the permutation or interleaving pattern may be symbol dependent, which may increase efficiency if there are many resource elements 245 per symbol (e.g., such that there is more than one code block per symbol).

In some examples, the first wireless device 205 may apply a 2-dimensional permutation or interleaving pattern to the delay-Doppler resource grid 250 prior to mapping the information samples to the delay-Doppler resource grid 250. In some examples, the 2-dimensional permutation or interleaving pattern may be symbol dependent.

Figure 3:
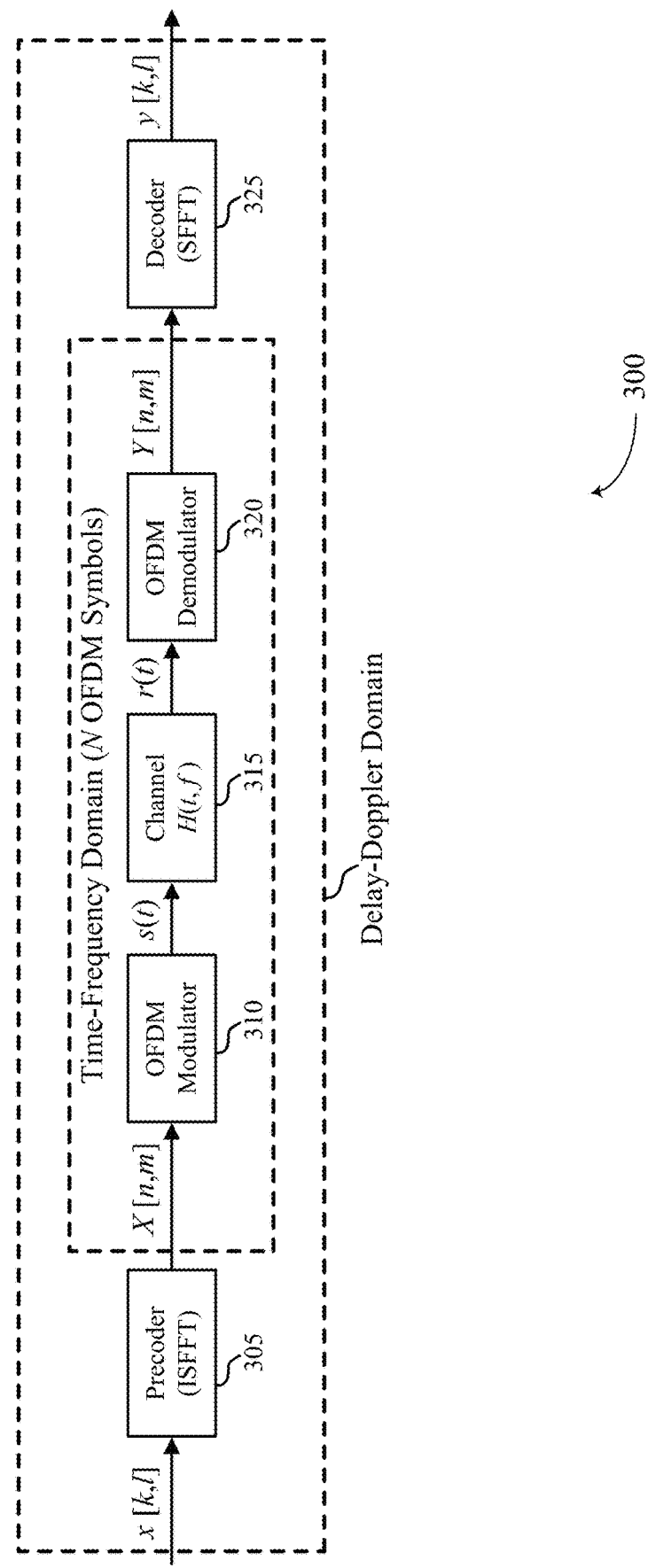
FIG. 3 illustrates an example of a coding scheme that supports techniques for rate matching order for OTFS multiplexing in accordance with various aspects of the present disclosure.

FIG. 3 illustrates an example of a coding scheme 300 that supports techniques for rate matching order for OTFS multiplexing in accordance with various aspects of the present disclosure. The coding scheme 300 may be implemented to realize aspects of the wireless communications system 100 or the wireless communications system 200. For example, a base station 105, a UE 115, a wireless device 205, or a wireless device 210 as described with reference to FIGS. 1 and 2 may perform one or more operations or processing tasks associated with the coding scheme 300 to transmit or receive an OTFS waveform.

In some aspects, OTFS modulation or precoding may be seen or understood as an ISFFT precoder 305 applied or performed on N consecutive OFDM symbols. For example, the transmitting device (e.g., the first wireless device 205 of FIG. 2) may include one or more components associated with the ISFFT precoder 305 and may perform or apply an ISFFT to a set of symbols x[k, l] (which may be examples of DMRS symbols (e.g., DMRS symbols in the channel estimation block 235 of FIG. 2). An ISFFT may be an example of a 2-dimensional fast Fourier transform (FFT), where N is a quantity of OFDM symbols and M is a quantity of subcarriers. As part of the coding scheme 300, symbols may be placed in the delay-Doppler domain (e.g., DMRS symbols may be placed in the channel estimation block 235 and information symbols may be placed in the data block 240 as described with reference to FIG. 2) instead of in the time-frequency domain (as may be performed for OFDM), and the transmitting device may transform the symbols from the delay-Doppler domain to the time-frequency domain via an ISFFT. Further, an ISFFT may be associated with an inverse fast Fourier transform (IFFT) in the Doppler domain and an FFT in the delay domain, as illustrated by and described in more detail with reference to FIG. 4.

The transmitting device may obtain, as an output of the ISFFT precoder 305, a set of symbols X[n, m], which may be defined in accordance with Equation 1.

$$X[n,m] = \frac{1}{\sqrt{NM}}\sum_{k=0}^{N-1}\sum_{l=0}^{M-1}x[k,l]e^{j2\pi\left(\frac{nk}{N}-\frac{ml}{M}\right)} \quad (1)$$

The transmitting device may perform or apply an OFDM modulator 310 on the set of symbols X[n, m] to obtain a time-domain signal s(t) and may transmit the time-domain signal s(t) over-the-air to the receiving device (e.g., the second wireless device 210 of FIG. 2). The over-the-air signaling between the transmitting device and the receiving device may be associated with a time-frequency channel 315, which may be understood as H(t, f). The time-frequency channel 315 may be related to the delay-Doppler channel. For example, in some implementations, a relationship between the delay-Doppler channel h(Σ, ν) and the time-frequency channel 315 H(t, f) may be defined in accordance with Equations 2 and 3.

$$h(\Sigma, \nu) = \iint H(t,f)e^{-j2\pi(\nu t - f\tau)} dt \, df \quad (2)$$

$$H(t,f) = \iint h(\tau, \nu)e^{j2\pi(\nu t - f\tau)} d\tau \, d\nu \quad (3)$$

In a discrete domain (such as in a domain associated with a quantity of discrete points or values), the relationship between the delay-Doppler channel h(τ, ν)=h(l, k) and the time-frequency channel 315 H(t, f)=H(n, m) may be defined in accordance with Equations 4 and 5.

$$h[l, k] = \sum_{k=0}^{N-1} \sum_{l=0}^{M-1} H[n, m]e^{-j2\pi nk} e^{j2\pi ml} \quad (4)$$

$$H[n, m] = \sum_{k} \sum_{l} h[l, k]e^{j2\pi nk} e^{-j2\pi ml} \quad (5)$$

In some aspects, and due to or associated with an under-spread nature of the channel, h[l, k] may be non-zero for $$k < \frac{v_{max}}{\Delta f}, l < \frac{\tau_{max}}{T},$$

where Δf is a subcarrier spacing, T is an OFDM symbol duration, M is a quantity of subcarriers, N is a quantity of OFDM symbols, and $\tau_{max}$ and $v_{max}$ are a maximum delay spread and a maximum Doppler spread of the channel, respectively.

The receiving device may receive a time-domain signal r(t) (such that r(t)=H(t, f)s(t)) and may perform or apply an OFDM demodulator 320 on the time domain signal r(t) to obtain a set of symbols Y[n, m] in the time-frequency domain. The receiving device may perform or apply, via one or more components associated with an SFFT precoder 325, an SFFT on the set of symbols Y[n, m] in the time-frequency domain to obtain a set of symbols y[k, l] in the delay-Doppler domain. The receiving device may perform or apply a circular correlation or convolution to obtain the delay-Doppler channel and an OTFS input-output relation in scenarios of delay-Doppler channel may be associated with a circular convolution (such as a 2-dimensional circular convolution) with varying phase shifts and defined in accordance with Equation 6.

$$y[k, l] = \sum_{i=0}^{P} h_i e^{j2\pi\left(\frac{l-l_{\tau_i}}{M}\right)\frac{k v_i}{N}} \alpha_i(k, l) \times \left[[k - k_{v_i}]_N, [l - l_{\tau_i}]_M\right] \quad (6)$$

In some aspects, and due in part to the under-spread nature, the channel may occupy a relatively small fraction or portion (such as a relatively small fraction or portion around an origin) of a delay-Doppler grid. As shown in Equation 6, P may be a quantity of delay-Doppler paths, $l_\tau$ may be a delay tap, $k_\nu$ may be a Doppler tap, and $\alpha_i(k, l)$ may be defined in accordance with Equation 7.

$$\alpha_i(k, l) = \begin{cases} 1 & l_{\tau_i} \leq l \leq M \\ e^{-j2\pi\left(\frac{[k-k_{v_i}]_N}{N}\right)} & 0 \leq l \leq l_{\tau_i} \end{cases} \quad (7)$$

In some implementations, a relation between the DMRS symbols transmitted by the transmitting device and received by the receiving device in the delay-Doppler domain may be approximated in accordance with Equation 8.

$$\tilde{y}[l', k'] \approx \sum_{k} \sum_{l} h[l, k] \tilde{x}\left[\text{mod}(l' - l, \tilde{M}), \text{mod}(k' - k, \tilde{N})\right] \quad (8)$$

As shown in Equation 8, $\tilde{x}[l', k']$ and $\tilde{y}[l', k']$ may be the transmitted and received sequences corresponding to the DMRS and information symbols, respectively, in the delay-Doppler domain and h[l, k] may be the delay-Doppler channel. In some implementations, the receiving device may estimate or measure a value of the delay-Doppler channel h[l, k] in accordance with implementing a circular correlator (such as a 2-dimensional circular correlator). In some aspects, the receiving device may selectively perform or apply the circular correlator in accordance with one or more properties or characteristics of the transmitted or received DMRS symbols. For example, the receiving device may perform or apply the circular correlator if the sequence $\tilde{x}[l', k']$ has suitable correlation properties (such as a correlation value that satisfies a threshold correlation value) or may refrain from performing or applying the circular correlator if the sequence $\tilde{x}[l', k']$ has unsuitable correlation properties (such as a correlation value that fails to satisfy a threshold correlation value).

In implementations in which the receiving device estimates a value of h[l, k], the receiving device may calculate, compute, or otherwise determine inter-carrier interference (ICI) in OFDM as the off-diagonal elements of $F\tilde{H}F^H$, where $\tilde{H}$ may be defined in accordance with Equation 9 and where F may be an FFT matrix. In accordance with Equation 9, for a zero Doppler scenario, $\tilde{H}$ may become a circular matrix with a first column as a channel impulse response.

$$\tilde{H}[p, q] = \sum_{k} \sum_{l} h[l, k] \delta(\text{mod}(p - q - l, M)) e^{j2\pi qk} \quad (9)$$

As such, the receiving device may measure or estimate a value of the delay-Doppler channel h[l, k] and may use the measured or estimated channel h[l, k] to measure or estimate an ICI associated with the channel. Further, and as a result of implementing the examples disclosed herein, the receiving device may be able to more accurately measure or estimate the ICI associated with the channel in scenarios in which the receiving device is in a high mobility state (such as moving relatively quickly) or otherwise in a high Doppler scenario.

Figure 4:
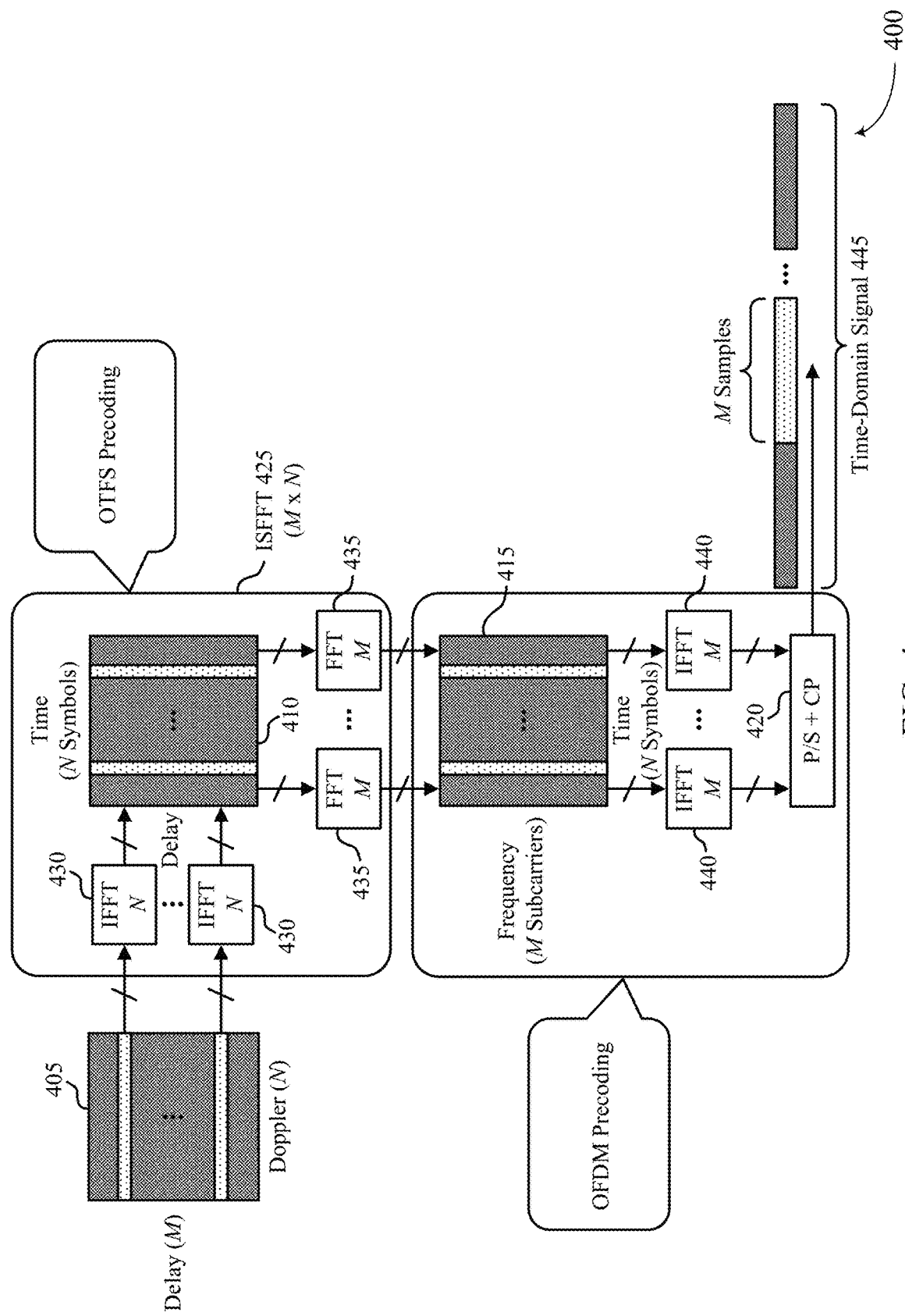
FIG. 4 illustrates an example of a processing diagram that supports techniques for rate matching order for OTFS multiplexing in accordance with various aspects of the present disclosure.

FIG. 4 illustrates an example of a processing diagram 400 that supports techniques for rate matching order for OTFS multiplexing in accordance with various aspects of the present disclosure. The processing diagram 400 may be implemented to realize aspects of the wireless communications system 100, the wireless communications system 200, or the coding scheme 300. For example, a base station 105, a UE 115, a wireless device 205, or a wireless device 210, as described with reference to FIGS. 1 and 2 may perform one or more operations of the processing diagram 400 to support an OTFS transmitter implementation.

For example, the second wireless device 210 may allocate or place DMRS symbols or information symbols, or a combination thereof, in a delay-Doppler domain associated with, in the example of FIG. 4, a delay-domain size of M and a Doppler-domain size of N. Accordingly, a set of delay-Doppler domain resources 405 may have dimensions of M×N. For example, the delay-Doppler domain resources 405 may correspond to the delay-Doppler resource grid 250 of FIG. 2. For some modulation techniques, such as a quadrature-amplitude modulation (QAM) or a quotient QAM (Q-QAM), the delay-Doppler domain resources 405 may convey MN*$\log_2(Q)$ bits.

To generate an OTFS waveform (such as an OTFS precoded waveform), the transmitting device (e.g., first wireless device 205 of FIG. 2) may perform or apply an ISFFT 425 of size M×N to convert the delay-Doppler domain resources 405 (including DMRS symbols or information symbols) to a set of time-frequency domain resources 415. To perform the ISFFT 425, which may be associated with or equivalently referred to as an OTFS precoding, the transmitting device may perform or apply an IFFT 430 of size N on the delay-Doppler domain resources 405 to obtain a set of delay-time domain resources 410 and may perform or apply an FFT 435 of size M on the delay-time domain resources 410 to obtain the time-frequency domain resources 415.

The transmitting device may perform or apply an IFFT 440 of size M on the set of time-frequency domain resources 415 to obtain a phase shift (P/S) and cyclic prefix (CP) 420 associated with a time-domain signal 445. In some aspects, the performance of the IFFT 440 on the set of time-frequency domain resources 415 may involve one or more processing steps that are associated with (such as identical to) processing associated with an OFDM waveform or OFDM precoding. The transmitting device may output the P/S and CP 420 to the time-domain signal 445. In some aspects, the time-domain signal 445 may include a quantity of N symbols and each of the N symbols may include or convey M samples.

Accordingly, in some implementations, the transmitting device may perform a set of one or more operations (such as operations associated with both the OTFS precoding and the OFDM precoding) of the processing diagram 400 for a set of DMRS symbols and information symbols. As such, the transmitting device may generate and output a time-domain signal 445 including an OTFS precoded waveform carrying the DMRS symbols and the information symbols. A receiving device (e.g., second wireless device 210 of FIG. 2) may receive the time-domain signal 445 and, in some implementations, may perform one or more operations associated with reversing the processing diagram 400 (such as to obtain the information symbols and the DMRS symbols in the delay-Doppler domain).

Figure 5:
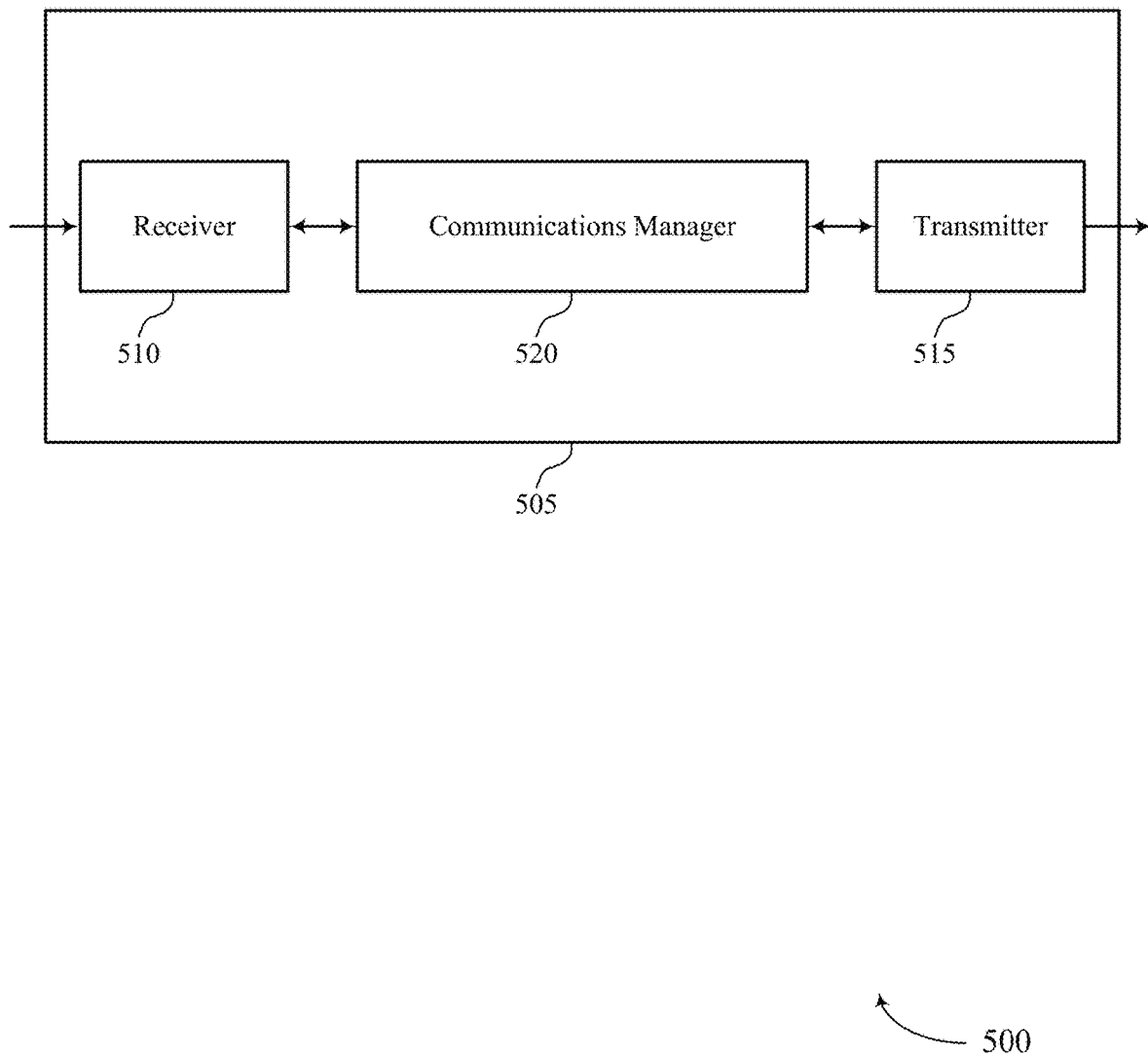
FIGS. 5 and 6 show block diagrams of devices that support techniques for rate matching order for OTFS multiplexing in accordance with various aspects of the present disclosure.

FIG. 5 shows a block diagram 500 of a device 505 that supports techniques for rate matching order for OTFS multiplexing in accordance with various aspects of the present disclosure. The device 505 may be an example of aspects of a UE 115, one or more components of a base station 105, a TRP, a small cell, a sidelink device, or any other device that is capable of transmitting an OTFS waveform as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for rate matching order for OTFS multiplexing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for rate matching order for OTFS multiplexing). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for rate matching order for OTFS multiplexing as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first device in accordance with examples as disclosed herein. For example, the communications manager 520 may be configured as or otherwise support a means for obtaining information samples for wireless transmission to a second device in accordance with an OTFS precoding scheme. The communications manager 520 may be configured as or otherwise support a means for mapping the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value. The communications manager 520 may be configured as or otherwise support a means for encoding, in accordance with the OTFS precoding scheme, a message including the mapped information samples and the channel estimation block. The communications manager 520 may be configured as or otherwise support a means for transmitting the encoded message to the second device via a wireless communication channel.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for low latency OTFS waveform generation and transmission, which may result in reduced processing and more efficient utilization of communication resources.

Figure 6:
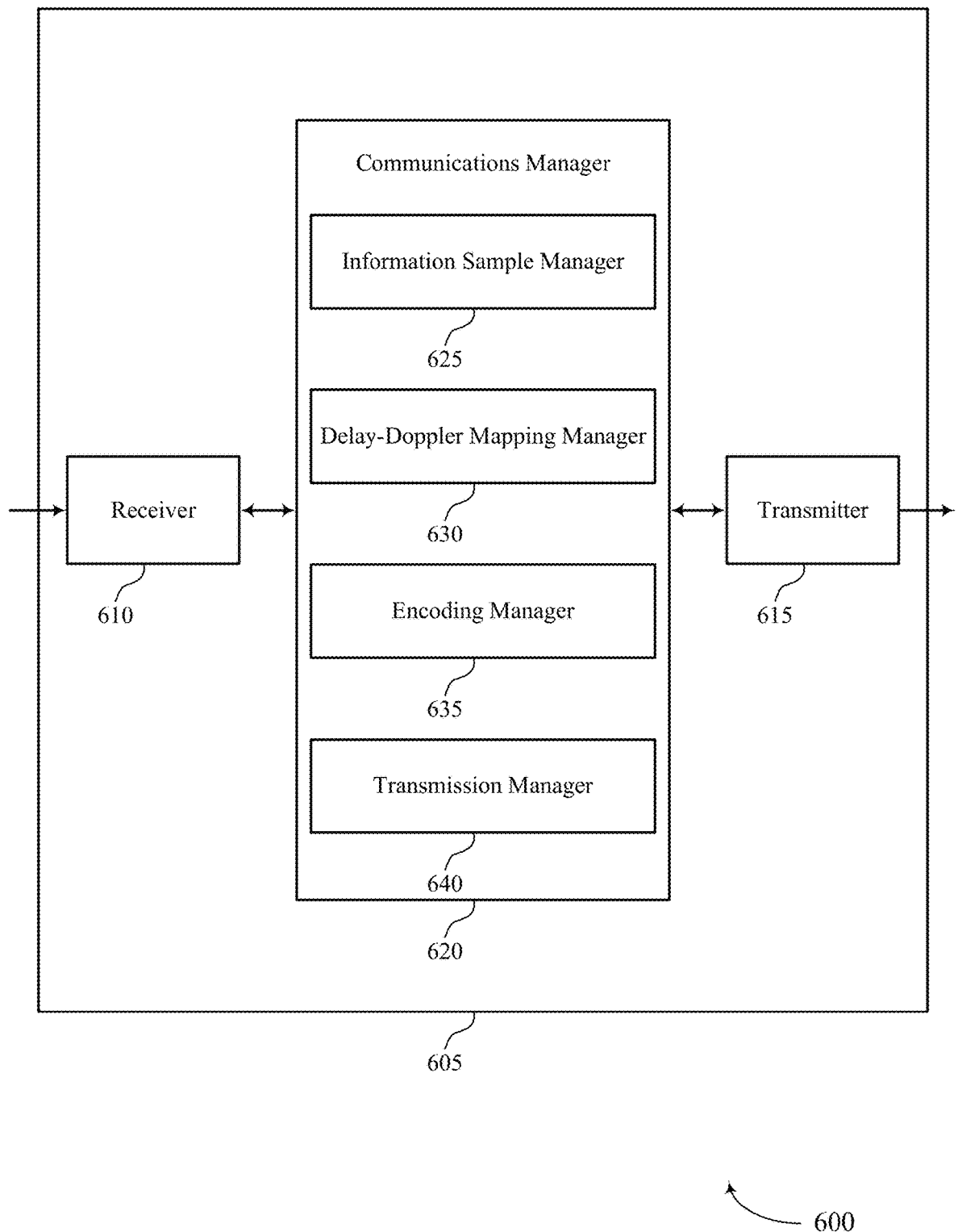

FIG. 6 shows a block diagram 600 of a device 605 that supports techniques for rate matching order for OTFS multiplexing in accordance with various aspects of the present disclosure. The device 605 may be an example of aspects of a device 505 or a UE 115, one or more components of a base station 105, a TRP, a small cell, a sidelink device, or any other device that is capable of transmitting an OTFS waveform as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for rate matching order for OTFS multiplexing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for rate matching order for OTFS multiplexing). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for rate matching order for OTFS multiplexing as described herein. For example, the communications manager 620 may include an information sample manager 625, a delay-Doppler mapping manager 630, an encoding manager 635, a transmission manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first device in accordance with examples as disclosed herein. The information sample manager 625 may be configured as or otherwise support a means for obtaining information samples for wireless transmission to a second device in accordance with an OTFS precoding scheme. The delay-Doppler mapping manager 630 may be configured as or otherwise support a means for mapping the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value. The encoding manager 635 may be configured as or otherwise support a means for encoding, in accordance with the OTFS precoding scheme, a message including the mapped information samples and the channel estimation block. The transmission manager 640 may be configured as or otherwise support a means for transmitting the encoded message to the second device via a wireless communication channel.

Figure 7:
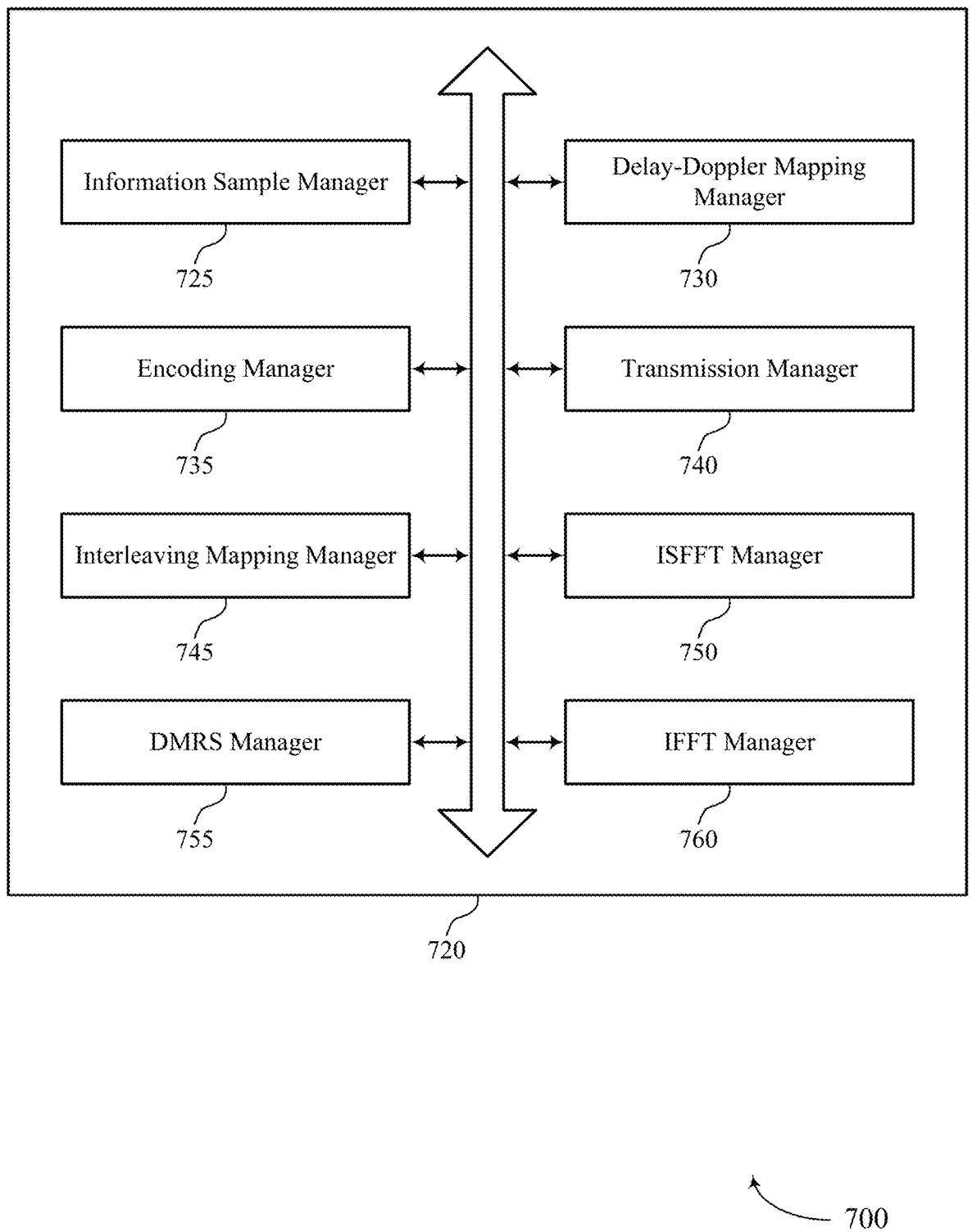
FIG. 7 shows a block diagram of a communications manager that supports techniques for rate matching order for OTFS multiplexing in accordance with various aspects of the present disclosure.

FIG. 7 shows a block diagram 700 of a communications manager 720 that supports techniques for rate matching order for OTFS multiplexing in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for rate matching order for OTFS multiplexing as described herein. For example, the communications manager 720 may include an information sample manager 725, a delay-Doppler mapping manager 730, an encoding manager 735, a transmission manager 740, an interleaving mapping manager 745, an ISFFT manager 750, a DMRS manager 755, an IFFT manager 760, or any combination thereof. Each of these components may communicate, directly or indirectly, with one another (e.g., via one or more buses).

The communications manager 720 may support wireless communications at a first device in accordance with examples as disclosed herein. The information sample manager 725 may be configured as or otherwise support a means for obtaining information samples for wireless transmission to a second device in accordance with an OTFS precoding scheme. The delay-Doppler mapping manager 730 may be configured as or otherwise support a means for mapping the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value. The encoding manager 735 may be configured as or otherwise support a means for encoding, in accordance with the OTFS precoding scheme, a message including the mapped information samples and the channel estimation block. The transmission manager 740 may be configured as or otherwise support a means for transmitting the encoded message to the second device via a wireless communication channel.

In some examples, to support mapping the information samples to the delay-Doppler resource grid, the delay-Doppler mapping manager 730 may be configured as or otherwise support a means for sequentially mapping the information samples within each respective subset of resource elements from a first resource element of the respective subset of resource elements having a lowest delay value to a second resource element of the respective subset of resource elements having a highest delay value.

In some examples, to support mapping the information samples to the delay-Doppler resource grid, the delay-Doppler mapping manager 730 may be configured as or otherwise support a means for sequentially mapping the information samples within each respective subset of resource elements from a first resource element of the respective subset of resource elements having a highest delay value to a second resource element of the respective subset of resource elements having a lowest delay value.

In some examples, to support mapping the information samples to the delay-Doppler resource grid, the interleaving mapping manager 745 may be configured as or otherwise support a means for mapping the information samples within each respective subset of resource elements according to an interleaving pattern.

In some examples, to support encoding the message, the ISFFT manager 750 may be configured as or otherwise support a means for applying an ISFFT transform to the mapped information samples and the channel estimation block.

In some examples, to support encoding the message, the IFFT manager 760 may be configured as or otherwise support a means for applying an IFFT to an output of the ISFFT to generate OTFS waveform.

In some examples, the subset of delay values is based on a delay spread of the wireless communication channel and a bandwidth of the wireless communication channel.

In some examples, the interleaving mapping manager 745 may be configured as or otherwise support a means for selecting an interleaving pattern for the delay-Doppler resource grid, where mapping the information samples to the delay-Doppler resource grid is based on the interleaving pattern.

In some examples, the DMRS manager 755 may be configured as or otherwise support a means for transmitting, in the channel estimation block, a demodulation reference signal.

Figure 8:
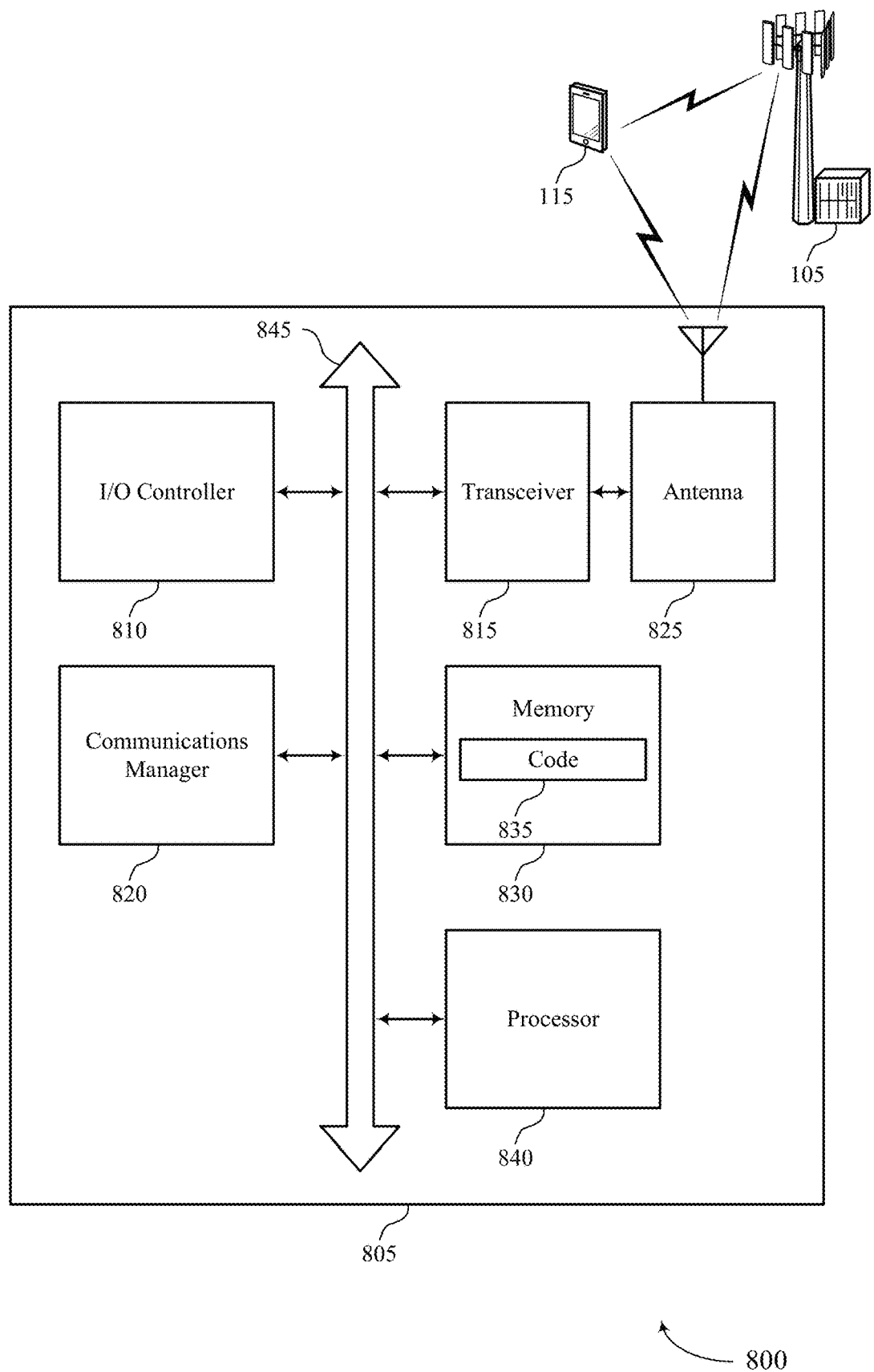
FIG. 8 shows a diagram of a system including a device that supports techniques for rate matching order for OTFS multiplexing in accordance with various aspects of the present disclosure.

FIG. 8 shows a diagram of a system 800 including a device 805 that supports techniques for rate matching order for OTFS multiplexing in accordance with various aspects of the present disclosure. The device 805 may be an example of or include the components of a device 505, a device 605, a UE 115, one or more components of a base station 105, a TRP, a small cell, a sidelink device, or any other device that is capable of transmitting an OTFS waveform as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed)

to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for rate matching order for OTFS multiplexing). For example, the device 805 or a component of the device 805 may include a processor 840 and memory 830 coupled with or to the processor 840, the processor 840 and memory 830 configured to perform various functions described herein.

The communications manager 820 may support wireless communications at a first device in accordance with examples as disclosed herein. For example, the communications manager 820 may be configured as or otherwise support a means for obtaining information samples for wireless transmission to a second device in accordance with an OTFS precoding scheme. The communications manager 820 may be configured as or otherwise support a means for mapping the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value. The communications manager 820 may be configured as or otherwise support a means for encoding, in accordance with the OTFS precoding scheme, a message including the mapped information samples and the channel estimation block. The communications manager 820 may be configured as or otherwise support a means for transmitting the encoded message to the second device via a wireless communication channel.

By including or configuring the communications manager 820 in accordance with examples as described herein, the device 805 may support techniques for low latency OTFS waveform generation and transmission, which may result in improved communication reliability, reduced latency, improved user experience related to reduced processing, more efficient utilization of communication resources, improved coordination between devices, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for rate matching order for OTFS multiplexing as described herein, or the processor 840 and the memory 830 may be otherwise configured to perform or support such operations.

Figure 9:
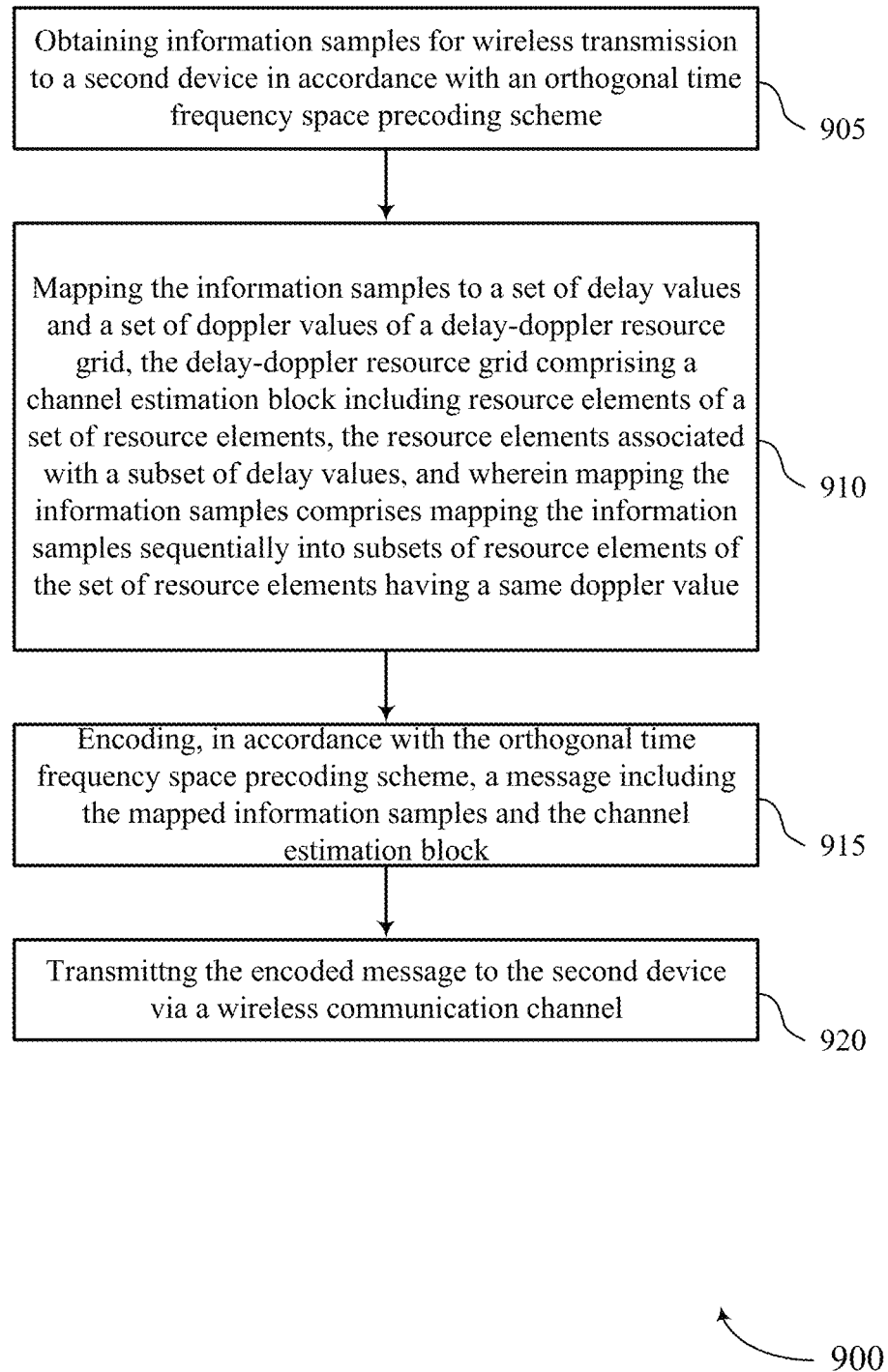
FIGS. 9 through 11 show flowcharts illustrating methods that support techniques for rate matching order for OTFS multiplexing in accordance with various aspects of the present disclosure.

FIG. 9 shows a flowchart illustrating a method 900 that supports techniques for rate matching order for OTFS multiplexing in accordance with various aspects of the present disclosure. The operations of the method 900 may be implemented by a UE or its components, one or more components of a base station 105, a TRP, a small cell, a sidelink device, or any other device that is capable of transmitting an OTFS waveform as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include obtaining information samples for wireless transmission to a second device in accordance with an OTFS precoding scheme. The operations of 905 may be performed in accordance with examples as disclosed herein. In some examples, aspects of the operations of 905 may be performed by an information sample manager 725 as described with reference to FIG. 7.

At 910, the method may include mapping the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value. The operations of 910 may be performed in accordance with examples as disclosed herein. In some examples, aspects of the operations of 910 may be performed by a delay-Doppler mapping manager 730 as described with reference to FIG. 7.

At 915, the method may include encoding, in accordance with the OTFS precoding scheme, a message including the mapped information samples and the channel estimation block. The operations of 915 may be performed in accordance with examples as disclosed herein. In some examples, aspects of the operations of 915 may be performed by an encoding manager 735 as described with reference to FIG. 7.

At 920, the method may include transmitting the encoded message to the second device via a wireless communication channel. The operations of 920 may be performed in accordance with examples as disclosed herein. In some examples, aspects of the operations of 920 may be performed by a transmission manager 740 as described with reference to FIG. 7.

Figure 10:
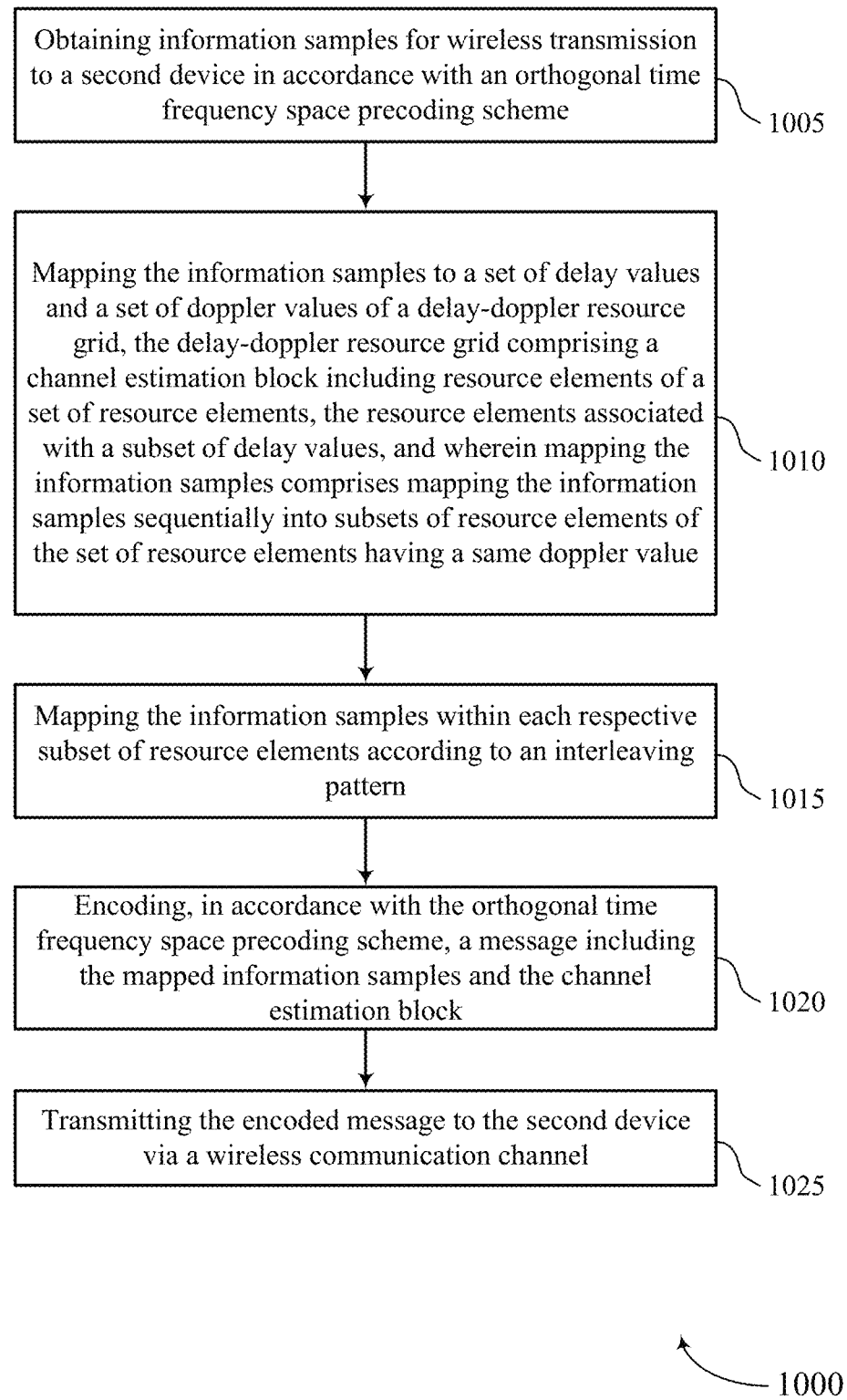

FIG. 10 shows a flowchart illustrating a method 1000 that supports techniques for rate matching order for OTFS multiplexing in accordance with various aspects of the present disclosure. The operations of the method 1000 may be implemented by a UE or its components, one or more components of a base station 105, a TRP, a small cell, a sidelink device, or any other device that is capable of transmitting an OTFS waveform as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include obtaining information samples for wireless transmission to a second device in accordance with an OTFS precoding scheme. The operations of 1005 may be performed in accordance with examples as disclosed herein. In some examples, aspects of the operations of 1005 may be performed by an information sample manager 725 as described with reference to FIG. 7.

At 1010, the method may include mapping the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value. The operations of 1010 may be performed in accordance with examples as disclosed herein. In some examples, aspects of the operations of 1010 may be performed by a delay-Doppler mapping manager 730 as described with reference to FIG. 7.

At 1015, the method may include mapping the information samples within each respective subset of resource elements according to an interleaving pattern. The operations of 1015 may be performed in accordance with examples as disclosed herein. In some examples, aspects of the operations of 1015 may be performed by an interleaving mapping manager 745 as described with reference to FIG. 7.

At 1020, the method may include encoding, in accordance with the OTFS precoding scheme, a message including the mapped information samples and the channel estimation block. The operations of 1020 may be performed in accordance with examples as disclosed herein. In some examples, aspects of the operations of 1020 may be performed by an encoding manager 735 as described with reference to FIG. 7.

At 1025, the method may include transmitting the encoded message to the second device via a wireless communication channel. The operations of 1025 may be performed in accordance with examples as disclosed herein. In some examples, aspects of the operations of 1025 may be performed by a transmission manager 740 as described with reference to FIG. 7.

Figure 11:
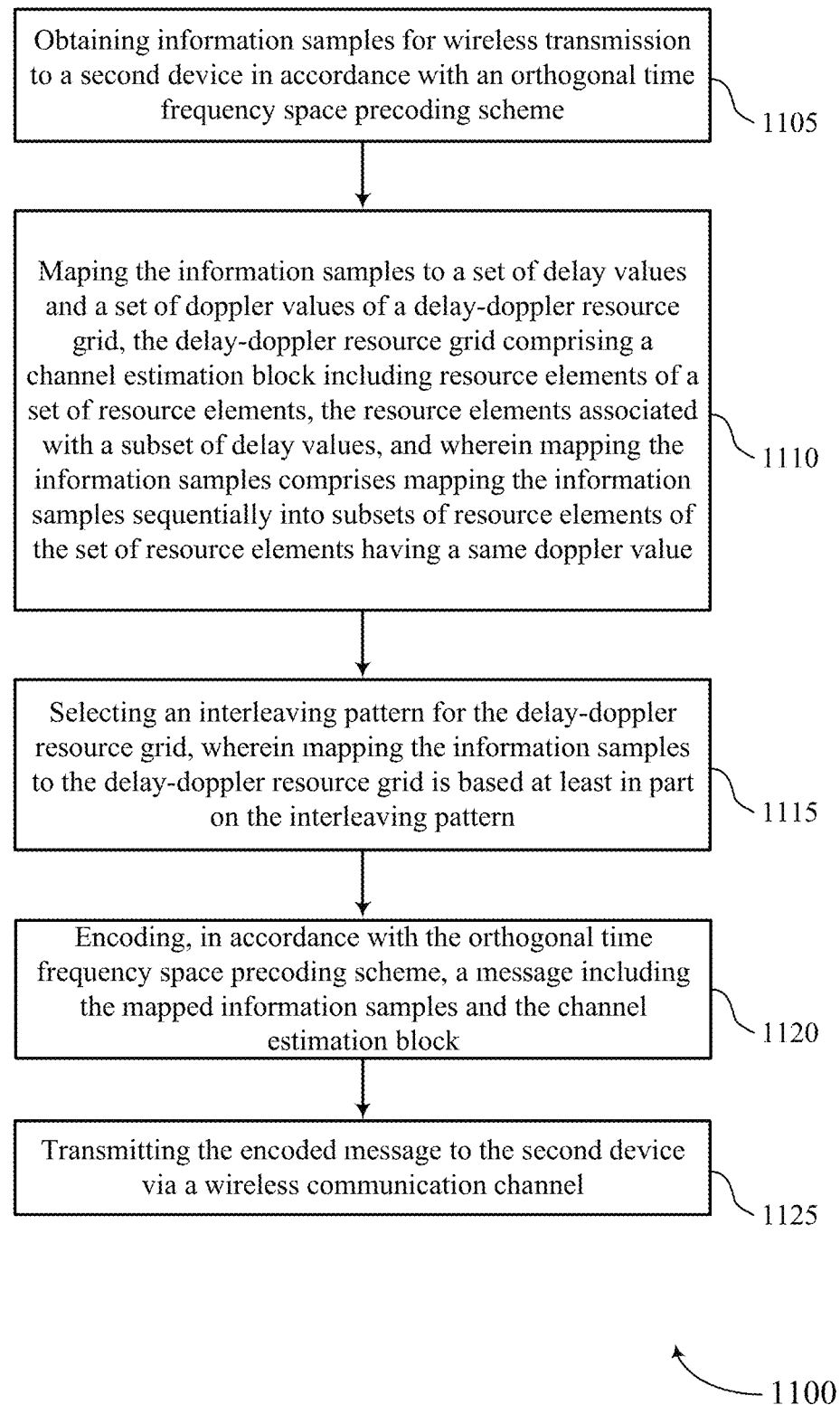

FIG. 11 shows a flowchart illustrating a method 1100 that supports techniques for rate matching order for OTFS multiplexing in accordance with various aspects of the present disclosure. The operations of the method 1100 may be implemented by a UE or its components, one or more components of a base station 105, a TRP, a small cell, a sidelink device, or any other device that is capable of transmitting an OTFS waveform as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include obtaining information samples for wireless transmission to a second device in accordance with an OTFS precoding scheme. The operations of 1105 may be performed in accordance with examples as disclosed herein. In some examples, aspects of the operations of 1105 may be performed by an information sample manager 725 as described with reference to FIG. 7.

At 1110, the method may include mapping the information samples to a set of delay values and a set of Doppler values of a delay-Doppler resource grid, the delay-Doppler resource grid including a channel estimation block including resource elements of a set of resource elements, the resource elements associated with a subset of delay values, and where mapping the information samples includes mapping the information samples sequentially into subsets of resource elements of the set of resource elements having a same Doppler value. The operations of 1110 may be performed in accordance with examples as disclosed herein. In some examples, aspects of the operations of 1110 may be performed by a delay-Doppler mapping manager 730 as described with reference to FIG. 7.

At 1115, the method may include selecting an interleaving pattern for the delay-Doppler resource grid, where mapping the information samples to the delay-Doppler resource grid is based on the interleaving pattern. The operations of 1115 may be performed in accordance with examples as disclosed herein. In some examples, aspects of the operations of 1115 may be performed by an interleaving mapping manager 745 as described with reference to FIG. 7.

At 1120, the method may include encoding, in accordance with the OTFS precoding scheme, a message including the mapped information samples and the channel estimation block. The operations of 1120 may be performed in accordance with examples as disclosed herein. In some examples, aspects of the operations of 1120 may be performed by an encoding manager 735 as described with reference to FIG. 7.

At 1125, the method may include transmitting the encoded message to the second device via a wireless communication channel. The operations of 1125 may be performed in accordance with examples as disclosed herein. In some examples, aspects of the operations of 1125 may be performed by a transmission manager 740 as described with reference to FIG. 7.

The following provides an overview of aspects of the present disclosure:

Aspect 1: A method for wireless communications at a first device, comprising: obtaining information samples for wireless transmission to a second device in accordance with an OTFS precoding scheme; mapping the information samples to a set of delay values and a set of Doppler values of a delay-Doppler resource grid, the delay-Doppler resource grid comprising a channel estimation block including resource elements of a set of resource elements, the resource elements associated with a subset of delay values, and wherein mapping the information samples comprises mapping the information samples sequentially into subsets of resource elements of the set of resource elements having a same Doppler value; encoding, in accordance with the OTFS precoding scheme, a message including the mapped information samples and the channel estimation block; and transmitting the encoded message to the second device via a wireless communication channel.

Aspect 2: The method of aspect 1, wherein mapping the information samples to the delay-Doppler resource grid comprises: sequentially mapping the information samples within each respective subset of resource elements from a first resource element of the respective subset of resource elements having a lowest delay value to a second resource element of the respective subset of resource elements having a highest delay value.

Aspect 3: The method of any of aspects 1 through 2, wherein mapping the information samples to the delay-Doppler resource grid comprises: sequentially mapping the information samples within each respective subset of resource elements from a first resource element of the respective subset of resource elements having a highest delay value to a second resource element of the respective subset of resource elements having a lowest delay value.

Aspect 4: The method of any of aspects 1 through 3, wherein mapping the information samples to the delay-Doppler resource grid comprises: mapping the information samples within each respective subset of resource elements according to an interleaving pattern.

Aspect 5: The method of any of aspects 1 through 4, wherein encoding the message comprises: applying an ISFFT to the mapped information samples and the channel estimation block.

Aspect 6: The method of aspect 5, wherein encoding the message comprises: applying an inverse fast Fourier transform to an output of the ISFFT to generate an OTFS waveform.

Aspect 7: The method of any of aspects 1 through 6, wherein the subset of delay values is based at least in part on a delay spread of the wireless communication channel and a bandwidth of the wireless communication channel.

Aspect 8: The method of any of aspects 1 through 7, further comprising: selecting an interleaving pattern for the delay-Doppler resource grid, wherein mapping the information samples to the delay-Doppler resource grid is based at least in part on the interleaving pattern.

Aspect 9: The method of any of aspects 1 through 8, further comprising: transmitting, in the channel estimation block, a demodulation reference signal.

Aspect 10: An apparatus for wireless communications at a first device, comprising a processor; memory coupled with the processor; and instructions stored in the memory and executable by the processor to cause the apparatus to perform a method of any of aspects 1 through 9.

Aspect 11: An apparatus for wireless communications at a first device, comprising at least one means for performing a method of any of aspects 1 through 9.

Aspect 12: A non-transitory computer-readable medium storing code for wireless communications at a first device, the code comprising instructions executable by a processor to perform a method of any of aspects 1 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or DSPAB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first device, comprising:
    obtaining information samples for wireless transmission to a second device in accordance with an orthogonal time frequency space precoding scheme;
    mapping the information samples to a set of delay values and a set of Doppler values of a delay-Doppler resource grid, the delay-Doppler resource grid comprising a channel estimation block including resource elements of a set of resource elements, the resource elements associated with a subset of delay values, and wherein mapping the information samples comprises mapping the information samples sequentially into a first subset of resource elements of the set of resource elements before mapping the information samples into a second subset of resource elements of the set of resource elements, the first subset of resource elements having a first Doppler value, and the second subset of resource elements having a second Doppler value different than the first Doppler value;
    encoding, in accordance with the orthogonal time frequency space precoding scheme, a message including the mapped information samples and the channel estimation block; and
    transmitting the encoded message to the second device via a wireless communication channel.

2. The method of claim 1, wherein mapping the information samples to the delay-Doppler resource grid comprises:
    sequentially mapping the information samples within each respective subset of resource elements having a same Doppler value from a first resource element of the respective subset of resource elements having a lowest delay value to a second resource element of the respective subset of resource elements having a highest delay value.

3. The method of claim 1, wherein mapping the information samples to the delay-Doppler resource grid comprises:
    sequentially mapping the information samples within each respective subset of resource elements having a same Doppler value from a first resource element of the respective subset of resource elements having a highest delay value to a second resource element of the respective subset of resource elements having a lowest delay value.

4. The method of claim 1, wherein mapping the information samples to the delay-Doppler resource grid comprises:
    mapping the information samples within each respective subset of resource elements having a same Doppler value according to an interleaving pattern.

5. The method of claim 1, wherein encoding the message comprises:
    applying an inverse symplectic fast Fourier transform to the mapped information samples and the channel estimation block.

6. The method of claim 5, wherein encoding the message comprises:
    applying an inverse fast Fourier transform to an output of the inverse symplectic fast Fourier transform to generate an orthogonal time frequency space waveform.

7. The method of claim 1, wherein the subset of delay values is based at least in part on a delay spread of the wireless communication channel and a bandwidth of the wireless communication channel.

8. The method of claim 1, further comprising:
    selecting an interleaving pattern for the delay-Doppler resource grid, wherein mapping the information samples to the delay-Doppler resource grid is based at least in part on the interleaving pattern.

9. The method of claim 1, further comprising:
    transmitting, in the channel estimation block, a demodulation reference signal.

10. An apparatus for wireless communications at a first device, comprising:
    one or more processors;
    memory coupled with the one or more processors; and
    instructions stored in the memory and executable by the one or more processors to cause the apparatus to:
        obtain information samples for wireless transmission to a second device in accordance with an orthogonal time frequency space precoding scheme;
        map the information samples to a set of delay values and a set of Doppler values of a delay-Doppler resource grid, the delay-Doppler resource grid comprising a channel estimation block including resource elements of a set of resource elements, the resource elements associated with a subset of delay values, and wherein mapping the information samples comprises mapping the information samples sequentially into a first subset of resource elements of the set of resource elements before mapping the information samples into a second subset of resource elements of the set of resource elements, the first subset of resource elements having a first Doppler value, and the second subset of resource elements having a second Doppler value different than the first Doppler value;

encode, in accordance with the orthogonal time frequency space precoding scheme, a message including the mapped information samples and the channel estimation block; and transmit the encoded message to the second device via a wireless communication channel.

11. The apparatus of claim 10, wherein the instructions to map the information samples to the delay-Doppler resource grid are executable by the one or more processors to cause the apparatus to:

sequentially map the information samples within each respective subset of resource elements having a same Doppler value from a first resource element of the respective subset of resource elements having a lowest delay value to a second resource element of the respective subset of resource elements having a highest delay value.

12. The apparatus of claim 10, wherein the instructions to map the information samples to the delay-Doppler resource grid are executable by the one or more processors to cause the apparatus to:

sequentially map the information samples within each respective subset of resource elements having a same Doppler value from a first resource element of the respective subset of resource elements having a highest delay value to a second resource element of the respective subset of resource elements having a lowest delay value.

13. The apparatus of claim 10, wherein the instructions to map the information samples to the delay-Doppler resource grid are executable by the one or more processors to cause the apparatus to:

map the information samples within each respective subset of resource elements according to an interleaving pattern.

14. The apparatus of claim 10, wherein the instructions to encode the message are executable by the one or more processors to cause the apparatus to:

apply an inverse symplectic fast Fourier transform to the mapped information samples and the channel estimation block.

15. The apparatus of claim 14, wherein the instructions to encode the message are executable by the one or more processors to cause the apparatus to:

apply an inverse fast Fourier transform to an output of the inverse symplectic fast Fourier transform to generate an orthogonal time frequency space waveform.

16. The apparatus of claim 10, wherein the subset of delay values is based at least in part on a delay spread of the wireless communication channel and a bandwidth of the wireless communication channel.

17. The apparatus of claim 10, wherein the instructions are further executable by the one or more processors to cause the apparatus to:

select an interleaving pattern for the delay-Doppler resource grid, wherein mapping the information samples to the delay-Doppler resource grid is based at least in part on the interleaving pattern.

18. The apparatus of claim 10, wherein the instructions are further executable by the one or more processors to cause the apparatus to:

transmit, in the channel estimation block, a demodulation reference signal.

19. An apparatus for wireless communications at a first device, comprising:

means for obtaining information samples for wireless transmission to a second device in accordance with an orthogonal time frequency space precoding scheme;

means for mapping the information samples to a set of delay values and a set of Doppler values of a delay-Doppler resource grid, the delay-Doppler resource grid comprising a channel estimation block including resource elements of a set of resource elements, the resource elements associated with a subset of delay values, and wherein mapping the information samples comprises mapping the information samples sequentially into a first subset of resource elements of the set of resource elements before mapping the information samples into a second subset of resource elements of the set of resource elements, the first subset of resource elements having a first Doppler value, and the second subset of resource elements having a second Doppler value different than the first Doppler value;

means for encoding, in accordance with the orthogonal time frequency space precoding scheme, a message including the mapped information samples and the channel estimation block; and means for transmitting the encoded message to the second device via a wireless communication channel.

20. The apparatus of claim 19, wherein the means for mapping the information samples to the delay-Doppler resource grid comprise:

means for sequentially mapping the information samples within each respective subset of resource elements having a same Doppler value from a first resource element of the respective subset of resource elements having a lowest delay value to a second resource element of the respective subset of resource elements having a highest delay value.

21. The apparatus of claim 19, wherein the means for mapping the information samples to the delay-Doppler resource grid comprise:

means for sequentially mapping the information samples within each respective subset of resource elements having a same Doppler value from a first resource element of the respective subset of resource elements having a highest delay value to a second resource element of the respective subset of resource elements having a lowest delay value.

22. The apparatus of claim 19, wherein the means for mapping the information samples to the delay-Doppler resource grid comprise:

means for mapping the information samples within each respective subset of resource elements having a same Doppler value according to an interleaving pattern.

23. The apparatus of claim 19, wherein the means for encoding the message comprise:

means for applying an inverse symplectic fast Fourier transform to the mapped information samples and the channel estimation block.

24. The apparatus of claim 23, wherein the means for encoding the message comprise:
    means for applying an inverse fast Fourier transform to an output of the inverse symplectic fast Fourier transform to generate an orthogonal time frequency space waveform.

25. The apparatus of claim 19, wherein the subset of delay values is based at least in part on a delay spread of the wireless communication channel and a bandwidth of the wireless communication channel.

26. The apparatus of claim 19, further comprising:
    means for selecting an interleaving pattern for the delay-Doppler resource grid, wherein mapping the information samples to the delay-Doppler resource grid is based at least in part on the interleaving pattern.

27. The apparatus of claim 19, further comprising:
    means for transmitting, in the channel estimation block, a demodulation reference signal.

28. A non-transitory computer-readable medium storing code for wireless communications at a first device, the code comprising instructions executable by one or more processors to:
    obtain information samples for wireless transmission to a second device in accordance with an orthogonal time frequency space precoding scheme;
    map the information samples to a set of delay values and a set of Doppler values of a delay-Doppler resource grid, the delay-Doppler resource grid comprising a channel estimation block including resource elements of a set of resource elements, the resource elements associated with a subset of delay values, and wherein mapping the information samples comprises mapping the information samples sequentially into a first subset of resource elements of the set of resource elements before mapping the information samples into a second subset of resource elements of the set of resource elements, the first subset of resource elements having a first Doppler value, and the second subset of resource elements having a second Doppler value different than the first Doppler value;
    encode, in accordance with the orthogonal time frequency space precoding scheme, a message including the mapped information samples and the channel estimation block; and
    transmit the encoded message to the second device via a wireless communication channel.

29. The non-transitory computer-readable medium of claim 28, wherein the instructions to map the information samples to the delay-Doppler resource grid are executable by the one or more processors to:
    sequentially map the information samples within each respective subset of resource elements having a same Doppler value from a first resource element of the respective subset of resource elements having a lowest delay value to a second resource element of the respective subset of resource elements having a highest delay value.

30. The non-transitory computer-readable medium of claim 28, wherein the instructions to map the information samples to the delay-Doppler resource grid are executable by the one or more processors to:
    sequentially map the information samples within each respective subset of resource elements having a same Doppler value from a first resource element of the respective subset of resource elements having a highest delay value to a second resource element of the respective subset of resource elements having a lowest delay value.

* * * * *